(12) United States Patent
Harris

(10) Patent No.: US 7,036,590 B2
(45) Date of Patent: May 2, 2006

(54) TWO STAGE SUBTERRANEAN ZONE FRACTURING FLUIDS AND METHODS

(75) Inventor: Phillip C. Harris, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 126 days.

(21) Appl. No.: 10/779,010

(22) Filed: Feb. 13, 2004

(65) Prior Publication Data

US 2005/0178553 A1    Aug. 18, 2005

(51) Int. Cl.
*E21B 43/267* (2006.01)

(52) U.S. Cl. ............... 166/280.1; 166/300; 166/308.5; 166/308.6; 507/201; 507/202; 507/211; 507/215; 507/216; 507/241; 507/273

(58) Field of Classification Search ............. 166/280.1, 166/300, 308.5, 308.6; 507/201, 202, 211, 507/215, 216, 241, 273
See application file for complete search history.

(56) References Cited

U.S. PATENT DOCUMENTS

| | | | | |
|---|---|---|---|---|
| 4,961,466 A | * | 10/1990 | Himes et al. | 166/308.5 |
| 5,271,466 A | * | 12/1993 | Harms | 166/300 |
| 5,460,226 A | * | 10/1995 | Lawson et al. | 166/300 |
| 5,497,830 A | * | 3/1996 | Boles et al. | 166/300 |
| 5,897,699 A | | 4/1999 | Chatterji et al. | |
| 6,063,738 A | | 5/2000 | Chatterji et al. | |
| 6,387,986 B1 | * | 5/2002 | Moradi-Araghi et al. | 523/211 |
| 6,971,448 B1 | * | 12/2005 | Slabaugh et al. | 166/294 |
| 2001/0003315 A1 | * | 6/2001 | Kelly et al. | 166/300 |

* cited by examiner

*Primary Examiner*—George Suchfield
(74) *Attorney, Agent, or Firm*—Robert A. Kent; Crutsinger & Booth

(57) ABSTRACT

The present invention discloses two stage subterranean zone fracturing fluids and methods. A two stage subterranean zone fracturing fluid of the invention comprises a first stage fluid comprising a foamed liquid containing a water soluble gel breaker and a second stage fluid that comprises a viscous liquid containing a metal cross-linked gelling agent. Another two stage subterranean zone fracturing fluid comprises a first stage fluid comprising a foamed liquid containing a water soluble gel breaker and a second stage fluid comprising a viscous liquid containing a borate cross-linked gelling agent.

29 Claims, No Drawings

TWO STAGE SUBTERRANEAN ZONE FRACTURING FLUIDS AND METHODS

BACKGROUND OF THE INVENTION

1. Field of the Invention

The present invention relates to two stage subterranean zone fracturing fluids and methods of fracturing subterranean zones with the fracturing fluids.

2. Description of the Prior Art

Hydrocarbon producing wells are often stimulated by hydraulic fracturing treatments. In such treatments, a viscous fracturing fluid which also functions as a carrier fluid is pumped into a producing zone to be fractured at a rate and pressure such that one or more fractures are formed in the zone. Proppant particles for propping the fractures open are suspended in at least a portion of the fracturing fluid so that the proppant particles are deposited in the fractures when the fracturing fluid is broken, i.e., the viscosity of the fluid is reduced. The breaking of the fracturing fluid is accomplished by a viscosity breaker in the fracturing fluid whereby the fracturing fluid reverts to a thin fluid which is returned to the surface. The proppant particles deposited in the fractures when the fracturing fluid viscosity is reduced function to prevent the fractures from closing so that conductive channels are formed through which produced hydrocarbons can readily flow.

While the fracturing fluids utilized heretofore have generally achieved good results, problems involving the reduction in the permeabilities of the fractured formations often occur. For example, the fracturing fluids have leaked off into the fractured formation walls whereby the permeabilities of the fractured formations are reduced and have allowed proppant particles to settle in the fractures prior to when the viscosities of the fracturing fluids are reduced. When the fracturing fluids are broken residue is often produced which enters and reduces the permeabilities of the proppant packs formed in the fractures. Finally, the recovery of the fracturing fluids after their viscosities are broken has often been difficult.

Foamed fracturing fluids have heretofore been utilized for their efficient creation of fractures. Because of the two phase character of the foamed fluids, when they enter high permeability zones, they block further flow into that zone. Foamed fracturing fluids are also known for their fluid loss control whereby a minimum thickness of gelled filter cake must be cleaned up later. Once the pumping of foamed fracturing fluids has ceased and the pressure exerted on the fluids is reduced, the foam expands and drives the liquid portions of the fracturing fluids into the well bore and to the surface for recovery. While the foams have excellent properties for forming and cleaning up fractures as described above, they are limited in their ability to contain high concentrations of proppant particles.

Hydraulic fracturing fluids prepared from liquids, polymers and cross-linking agents are commonly utilized as a result of their excellent proppant particle carrying ability. Also, as a result of the high viscosity of the fluids, they create wide fractures that can accept high concentrations of proppant particles. However, when such cross-linked fracturing fluids are used, relatively thick filter cake is deposited on the fracture faces which must be broken and removed in order to prevent the filter cake from entering and reducing the permeability of the proppant packs in the fractures when the well is produced. The filter cake on the fracture faces contains a high concentration of polymers and it is very difficult to dissolve and remove.

Thus, there are needs for fracturing fluids that have excellent fracture creating and clean up properties and are able to carry high quantities of proppant particles into the fractures.

SUMMARY OF THE INVENTION

The present invention provides novel two stage subterranean zone fracturing fluids and methods of fracturing subterranean zones utilizing the fracturing fluids which meet the needs described above and overcome the deficiencies of the prior art.

A method of fracturing a subterranean zone of this invention comprises the following steps. A first stage fluid comprising a foamed liquid containing a water soluble gel breaker is placed into a subterranean zone at a rate and pressure sufficient to create or extend at least one fracture therein. A second stage fluid comprising a viscous liquid containing proppant particles and a metal cross-linked gelling agent is then placed in the subterranean zone at a rate and pressure sufficient to cause the second stage fluid to enter the fracture. Thereafter, the pressure in the subterranean zone is reduced so that the first stage fluid mixes with the second stage fluid and the water soluble gel breaker in the first stage fluid reacts with and uncross-links the gelling agent in the second stage fluid whereby the viscosity of the fluid mixture is reduced, the proppant particles are deposited and the fluid mixture readily flows out of the subterranean formation.

Another method of the present invention of fracturing a subterranean zone comprises the following steps. A first stage fluid comprising a foamed liquid containing a water soluble gel breaker is placed into the subterranean zone at a rate and pressure sufficient to create or extend at least one fracture therein. A second stage fluid comprising a viscous liquid containing proppant particles and a borate cross-linked gelling agent is placed into the subterranean zone at a rate and pressure sufficient to cause the second stage fluid to enter the fracture. Thereafter, the pressure in the subterranean zone is reduced so that the first stage fluid mixes with the second stage fluid and the water soluble gel breaker in the first stage fluid reacts with and uncross-links the gelling agent in the second stage fluid whereby the viscosity of the fluid mixture is reduced, the proppant particles are deposited and the fluid mixture flows out of the subterranean formation.

A two stage subterranean zone fracturing fluid of this invention comprises a first stage fluid comprising a foamed liquid containing a water soluble gel breaker and a second stage fluid comprising a viscous liquid containing proppant particles and a metal cross-linked gelling agent.

Another two stage subterranean zone fracturing fluid of this invention comprises a first stage fluid comprising a foamed fluid containing a water soluble gel breaker and a second stage fluid comprising a viscous liquid containing proppant particles and a borate cross-linked gelling agent.

The objects, features and advantages of the present invention will be readily apparent to those skilled in the art upon a reading of the description of preferred embodiments which follows.

DESCRIPTION OF PREFERRED EMBODIMENTS

As indicated above, the present invention provides two stage subterranean zone fracturing fluids and methods of fracturing subterranean zones using the two stage fracturing fluids.

A method of this invention for fracturing a subterranean zone comprises the following steps. A first stage fluid comprising a foamed liquid containing a water soluble gel breaker is placed into a subterranean zone at a rate and pressure sufficient to create or extend at least one fracture therein. A second stage fluid comprising a viscous liquid containing proppant particles and a metal cross-linked gelling agent is then placed in the subterranean zone at a rate and pressure sufficient to cause the second stage fluid to enter the fracture. Thereafter, the pressure in the subterranean zone is reduced so that the first stage fluid mixes with the second stage fluid and the water soluble gel breaker in the first stage fluid reacts with and uncross-links the gelling agent in the second stage fluid whereby the viscosity of the fluid mixture is reduced, the proppant particles are deposited and the fluid mixture readily flows out of the subterranean zone.

A two stage subterranean zone fracturing fluid of this invention comprises a first stage fluid comprising a foamed liquid containing a water soluble gel breaker and a second stage fluid comprising a viscous liquid containing proppant particles and a metal cross-linked gelling agent.

The second stage fluid contains proppant particles which are deposited in the fracture or fractures whereby proppant particle packs are formed therein when the viscosity of the fluid mixture is reduced. The proppant particle packs formed prevent the fracture or fractures from closing so that conductive channels are formed in the subterranean zone.

While various liquids can be utilized in the first stage and second stage fluids of this invention, water is generally preferred. The term water is used herein to mean fresh water or salt water including brines and seawater.

The liquid in the first stage fluid is foamed with a gas selected from the group consisting of nitrogen, carbon dioxide and air. Of these, nitrogen is preferred. The foamed first stage fluid generally also includes a foaming and foam stabilizing surfactant or mixture of surfactants. Preferred foaming surfactants that can be utilized include, but are not limited to, an alphaolefin sulfonate, an ethoxylated alcohol sulfate, an alkyl or alkene amidopropyl betaine, or a quarternized trimethylcocoamine. A preferred foaming and foam stabilizing surfactant mixture that can be utilized comprises an ethoxylated alcohol ether sulfate surfactant, an alkyl or alkene amidopropyl betaine surfactant and an alkyl or alkene amidopropyl dimethyl amine oxide surfactant. This foaming and foam stabilizing surfactant mixture is described in detail in U.S. Pat. No. 6,063,738 issued to Chatterji, et al. on May 16, 2000, which is incorporated herein by reference thereto. Another preferred foaming and foam stabilizing surfactant mixture that can be utilized comprises an aqueous solution of an alpha-olefinic sulfonate surfactant and a betaine surfactant. This surfactant mixture is described in detail in U.S. Pat. No. 5,897,699 issued to Chatterji, et al. on Apr. 27, 1999, which is incorporated herein by reference thereto. The foaming and foam stabilizing surfactant or surfactant mixture utilized is generally included in the first stage fluid in an amount in the range of from about 0.1% to about 2.0% by weight of the liquid therein.

The water soluble gel breaker in the first stage fluid is present in the first stage fluid in an amount in the range of from about 0.1% to about 10% by weight of the liquid therein.

A particularly suitable water soluble gel breaker that can be utilized in the first stage fluid is ethylenediaminetetraacetic acid or a salt thereof. The solubility of the individual form of ethylenediaminetetraacetic acid or a salt thereof varies. For example, in the ethylenediaminetetraacetic acid form, the solubility is ~0.5 g/100 mL water; whereas, in the tetrasodium ethylenediaminetetraacetic form, the solubility is ~103 g/100 mL water.

While ethylenediaminetetraacetic acid or a salt thereof is presently preferred, other gel breakers that can be used include, but are not limited to, sodium peroxydisulfate, ammonium peroxydisulfate, t-butylhydroperoxide, calcium peroxide, magnesium peroxide, sodium chlorite or sodium bromate. In low temperature applications when guar or guar derivative gelling agents are utilized in the second stage fluid, enzyme gel breakers can be used in the first stage fluid including, but not limited to, hemicellulase, mannanase, or glactase. When necessary, the gel breaker utilized in the first stage fluid can be encapsulated or otherwise delayed.

The second stage fluid is a viscous liquid containing a metal cross-linked gelling agent and proppant particles. Examples of gelling agents that can be utilized include, but are not limited to, galactomannan gums, modified or derivatized galactomannan gums, cellulose derivatives, xanthan biopolymer, succinoglycan biopolymer, polyacrylamides, polyacrylates, and a terpolymer of 2-acrylamido-2-methylpropane sulfonic acid, acrylamide and acrylic acid.

Examples of more specific preferred gelling agents that can be utilized include, but are not limited to, hydroxyethylcellulose, hydroxypropyl guar, guar and anionically charged guar gelling agents such as carboxymethyl guar, carboxymethylhydroxypropylguar, carboxyethylguar and carboxymethylhydroxyethylcellulose. Most preferably, the gelling agent is guar. The gelling agent utilized is generally present in the second stage fluid in an amount in the range of from about 0.1% to about 1.0% by weight of the liquid therein, more preferably in an amount of about 0.2 to 0.75% by weight of the liquid therein.

Examples of metal ions that can be used to cross-link the gelling agent in the second stage fluid include, but are not limited to, titanium ions, zirconium ions and hafnium ions. The metal ion used is added to the fracturing fluid in the form of a metal ion-releasing compound. Examples of the metal ion-releasing compounds that can be utilized include, but are not limited to, titanium (IV) (triethanolaminato)-isopropoxide, tetrakis (triethanolaminato)-zirconium (IV), zirconium (IV) lactate, and hafnium (IV) acetylacetonate. Of these, tetrakis (triethanolaminato)-zirconium (IV) is preferred. The metal ion-releasing compound used is present in the second stage fluid in an amount in the range of from about 0.02% to about 1.0% by weight of the liquid therein.

As stated above, once the first stage fluid and second stage fluid have been placed in the fracture in the subterranean zone, the pressure exerted on the subterranean zone by the fracturing fluid is reduced so that the first stage fluid mixes with the second stage fluid and the water soluble gel breaker in the first stage fluid reacts with and removes the metal ion that cross-links the gelling agent in the second stage fluid. This uncross-linking of the gelling agent in the second stage fluid causes the viscosity of the fluid mixture to be reduced whereby proppant particles in the second stage fluid are deposited in the fracture or fractures and the gas in the fluid mixture expands and causes the fluid mixture to flow out of the subterranean zone.

Thus, the method of fracturing a subterranean zone of the present invention as described above creates one or more fractures in the subterranean zone, and when the pressure exerted on the subterranean zone is reduced, the proppant particles are deposited and the fracturing fluid mixture of low viscosity produced is readily removed from the fracture or fractures leaving the fracture faces and proppant packs therein in a clean and highly permeable state.

Another method of this invention for fracturing a subterranean zone comprises the following steps. A first stage fluid comprising a foamed liquid containing a water soluble gel breaker is placed in the subterranean zone at a pressure sufficient to create or extend at least one fracture therein. Carbon dioxide is construed to represent carbonic acid when carbon dioxide is used as the internal phase of an aqueous foam. A second stage fluid comprising a viscous liquid containing proppant particles and a borate cross-linked gelling agent is placed in the subterranean zone at a rate and pressure sufficient to cause the second stage fluid to enter the fracture. Thereafter, the pressure in the subterranean zone is reduced so that the first stage fluid mixes with the second stage fluid and the water soluble gel breaker in the first stage fluid reacts with and uncross-links the gelling agent in the second stage fluid whereby the viscosity of the fluid mixture is reduced, the proppant particles are deposited and the fluid mixture readily flows out of the subterranean zone.

Another two stage subterranean zone fracturing fluid of this invention comprises a first stage fluid comprising a foamed liquid containing a water soluble gel breaker and a second stage fluid comprising a viscous liquid containing proppant particles and a borate cross-linked gelling agent.

The liquid in the first stage and second stage fluids can be various liquids with water being preferred. The water can be fresh water or salt water including brines and seawater.

The liquid in the first stage fluid is foamed with a gas and includes a foaming and foam stabilizing surfactant or surfactant mixture in an amount in the range of from about 0.1% to about 2% by weight of the liquid therein. Various surfactants and surfactant mixtures that can be utilized are described above. The liquid in the first stage fluid also contains a water soluble gel breaker in an amount in the range of from about 0.1% to about 28% by weight of the liquid.

Particularly suitable water soluble gel breakers that can be utilized in the first stage fluid are mineral acids selected from the group consisting of hydrochloric acid, sulfuric acid and phosphoric acid. Of these, hydrochloric acid is preferred. Organic acids can also be used including, but not limited to, acetic acid, formic acid, and citric acid. Of these, acetic acid is preferred. The acid used is present in the first stage fluid in an amount in the range of from about 1% to about 28% (hydrochloric acid) by weight of the liquid therein, preferably in an amount of about 5% by weight.

Other water soluble gel breakers that can be used include, but are not limited to, sodium peroxysulfate, ammonium peroxysulfate, t-butylhydroperoxide, calcium peroxide, magnesium perioxide, sodium chlorite or sodium bromate. In low temperature applications when guar or guar derivative gelling agents are utilized in the second stage fluid, encapsulated or otherwise delayed enzyme gel breakers can be used including, but not limited to, hemicellulase, mannanase, or glactase. When necessary, the gel breaker utilized in the first stage fluid can be encapsulated or otherwise delayed.

The second stage fluid comprises a viscous liquid containing a borate cross-linked gelling agent and proppant particles. Examples of gelling agents that can be utilized include, but are not limited to, galactomannan gums, modified or derivatized galactomannan gums, cellulose derivatives, xanthan biopolymer, succinoglycan biopolymer, polyacrylamides, polyacrylates, and a terpolymer of 2-acrylamido-2-methylpropane sulfonic acid, acrylamide and acrylic acid.

More specific such gelling agents include, but are not limited to, hydroxyethylcellulose, hydroxypropyl guar, guar and anionically charged guar gelling agents such as carboxymethyl guar, carboxymethylhydroxypropylguar, carboxyethylguar and carboxymethylhydroxyethylcellulose. Of these, guar is preferred. The gelling agent is present in the second stage fluid in an amount in the range of from about 0.1% to about 1.0% by weight of the liquid therein.

Examples of borate cross-linkers which can be used to cross-link the gelling agent and increase the viscosity of the second stage fluid include, but are not limited to, boric acid, borax, ulexite and colemanite. Of these, boric acid is preferred. The borate cross-linker is generally present in the second stage fluid in an amount in the range of from about 0.03% to about 2% by weight of the liquid therein, more preferably in an amount of about 0.05 to 0.5% by weight.

As mentioned above, when the pressure in the subterranean zone is reduced, the first stage fluid mixes with the second stage fluid and the water soluble gel breaker in the first stage fluid reacts with and uncross-links the gelling agent in the second stage fluid whereby the viscosity of the fluid mixture is reduced, the proppant particles are deposited and the fracturing fluid mixture of low viscosity produced is readily removed from the fracture or fractures leaving the fracture faces and proppant packs therein in a clean and highly permeable state.

A preferred method of this invention for fracturing a subterranean zone comprises the steps of: (a) placing a first stage fluid that comprises a foamed liquid containing a water soluble gel breaker into the subterranean zone at a rate and pressure sufficient to create or extend at least one fracture therein; (b) placing a second stage fluid that comprises a viscous liquid containing proppant particles and a metal cross-linked gelling agent into the subterranean zone at a rate and pressure sufficient to cause the second stage fluid to enter the fracture; and (c) reducing the pressure in the subterranean zone so that the first stage fluid mixes with the second stage fluid and the water soluble gel breaker in the first stage fluid reacts with and uncross-links the gelling agent in the second stage fluid whereby the viscosity of the fluid mixture is reduced, the proppant particles are deposited and the fluid mixture flows out of the subterranean formation.

A preferred two stage subterranean zone fracturing fluid of this invention comprises: a first stage fluid that comprises a foamed liquid containing a water soluble gel breaker; and a second stage fluid that comprises a viscous liquid containing proppant particles and a metal cross-linked gelling agent.

Another preferred method of fracturing a subterranean zone of this invention comprises the steps of: (a) placing a first stage fluid that comprises a foamed liquid containing a water soluble gel breaker into the subterranean zone at a rate and pressure sufficient to create or extend at least one fracture therein; (b) placing a second stage fluid that comprises a viscous liquid containing proppant particles and a borate cross-linked gelling agent into the subterranean zone at a rate and pressure sufficient to cause the second stage fluid to enter the fracture; and (c) reducing the pressure in the subterranean zone so that the first stage fluid mixes with the second stage fluid and the water soluble gel breaker in the first stage fluid reacts with and uncross-links the gelling agent in the second stage fluid whereby the viscosity of the fluid mixture is reduced, the proppant particles are deposited and the mixture flows out of the subterranean formation.

Another preferred two stage subterranean zone fracturing fluid of this invention comprises: a first stage fluid comprising a foamed liquid containing a water soluble gel breaker;

and a second stage fluid comprising a viscous liquid containing proppant particles and a borate cross-linked gelling agent.

In order to further illustrate the methods and two stage fracturing fluids of this invention, the following examples are given.

EXAMPLE 1

A first fluid was formed by mixing 100 mL water, 2 g EDTA and 0.5 g alkylamidopropyl betaine surfactant in a 1 liter blender jar, then running the blender at moderate speed to incorporate air into the liquid and generate a fine texture foam.

A second liquid was formed in a separate blender jar by mixing 250 mL of water, 0.75 mL of a terpolymer, 2-acrylamido-2-methylpropane sulfonic acid, acrylamide and acrylic acid, 5 g of potassium chloride and acetate buffer. The mixture was allowed to form base gel liquid. To the base liquid 1.5 mL of a solution of tetrakis (triethanolaminato)-zirconium (IV) was added which formed a cross-linked gel.

Upon mixing the above described first and second liquids for 30 seconds in a 1 liter blender, the cross-linked gel reverted back to a base gel fluid. The base gel fluid had much less viscosity than the cross-linked gel.

EXAMPLE 2

A borate cross-linked guar gel was mixed in a flow loop viscometer. The fluid contained 0.36% guar, 0.2% borate cross-linker, 2.7% potassium nitrate and 0.5 g alkylamidopropyl betaine surfactant in water. The cross-linked gel was circulated to establish stability and its viscosity was measured at greater than 200 cP at 300 sec$^{-1}$.

Carbon dioxide was then pumped into the flow loop viscometer at a pressure of about 1000 psi while the borate cross-linked guar gel was being circulated. The viscosity of the combined fluids rapidly dropped to about 16 cP.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

The invention claimed is:

1. A method of fracturing a subterranean zone comprising the steps of:
  (a) placing a first stage fluid that comprises a foamed liquid containing a water soluble gel breaker into the subterranean zone at a rate and pressure sufficient to create or extend at least one fracture therein;
  (b) placing a second stage fluid that comprises a viscous liquid containing proppant particles and a metal cross-linked gelling agent into the subterranean zone at a rate and pressure sufficient to cause the second stage fluid to enter the fracture; and
  (c) reducing the pressure in the subterranean zone so that the first stage fluid mixes with the second stage fluid and the water soluble gel breaker in the first stage fluid reacts with and uncross-links the gelling agent in the second stage fluid whereby the viscosity of the fluid mixture is reduced, the proppant particles are deposited and the fluid mixture flows out of the subterranean formation.

2. The method of claim 1 wherein the liquid in the first stage and second stage fluids is water.

3. The method of claim 2 wherein the water in the first stage and second stage fluids is selected from the group consisting of fresh water and salt water.

4. The method of claim 1 wherein the liquid in the first stage fluid is foamed with a gas selected from the group consisting of nitrogen, carbon dioxide and air.

5. The method of claim 1 wherein the liquid in the first stage fluid is foamed with nitrogen.

6. The method of claim 1 wherein the water soluble gel breaker in the first stage fluid is selected from the group consisting of ethylenediaminetetraacetic acid or a salt thereof, sodium peroxydisulfate, ammonium peroxydisulfate, t-butylhydroperoxide, calcium peroxide, magnesium peroxide, sodium chlorite and sodium bromate.

7. The method of claim 1 wherein when the subterranean zone has a low temperature and the metal cross-linked gelling agent is guar or a guar derivative, the water soluble gel breaker in the first stage fluid is selected from the group consisting of hemicellulase enzyme, mannanase enzyme and glactase enzyme.

8. The method of claim 1 wherein the water soluble gel breaker in the first stage fluid is ethylenediaminetetraacetic acid or a salt thereof.

9. The method of claim 1 wherein the water soluble gel breaker is present in the first stage fluid in an amount in the range of from about 0.1% to about 10% by weight of the liquid therein.

10. The method of claim 1 wherein the gelling agent in the second stage fluid is selected from the group consisting of galactomannan gums, modified or derivatized galactomannan gums, cellulose derivatives, xanthan biopolymer, succinoglycan biopolymer, polyacrylamides, polyacrylates, and a terpolymer of 2-acrylamido-2-methylpropane sulfonic acid, acrylamide and acrylic acid.

11. The method of claim 1 wherein the gelling agent in the second stage fluid is selected from the group consisting of hydroxyethylcellulose, hydroxypropyl guar, guar and anionically charged guar gelling agents such as carboxymethyl guar, carboxymethylhydroxypropylguar, carboxyethylguar and carboxymethylhydroxyethylcellulose.

12. The method of claim 1 wherein the gelling agent in the second stage fluid is guar.

13. The method of claim 1 wherein the gelling agent is present in the second stage fluid in an amount in the range of from about 0.1% to about 1% by weight of the liquid therein.

14. The method of claim 1 wherein the metal cross-linker is selected from the group consisting of titanium (IV) (triethanolaminato)-isopropoxide, tetrakis (triethanolaminato)-zirconium (IV) and hafnium (IV) acetylacetonate.

15. The method of claim 1 wherein the metal cross-linker is tetrakis (triethanolaminato)-zirconium (IV).

16. The method of claim 1 wherein the metal cross-linker is present in the second stage fluid in an amount in the range of from about 0.02% to about 1% by weight of the liquid therein.

17. A method of fracturing a subterranean zone comprising the steps of:
  (a) placing a first stage fluid that comprises a foamed liquid containing a water soluble gel breaker into the subterranean zone at a rate and pressure sufficient to create or extend at least one fracture therein, wherein the water soluble gel breaker is selected from the group consisting of ethylenediaminetetraacetic acid or a salt thereof, sodium peroxydisulfate, ammonium peroxydisulfate, t-butylhydroperoxide, calcium peroxide, magnesium peroxide, sodium chlorite and sodium bromate;

(b) placing a second stage fluid that comprises a viscous liquid containing proppant particles and a borate cross-linked gelling agent into the subterranean zone at a rate and pressure sufficient to cause the second stage fluid to enter the fracture; and (c) reducing the pressure in the subterranean zone so that the first stage fluid mixes with the second stage fluid and the water soluble gel breaker in the first stage fluid reacts with and uncross-links the gelling agent in the second stage fluid whereby the viscosity of the fluid mixture is reduced.

18. The method of claim 17 wherein the liquid in the first stage and second stage fluids is water.

19. The method of claim 18 wherein the water in the first stage and second stage fluids is selected from the group consisting of fresh water and salt water.

20. The method of claim 17 wherein the liquid in the first stage fluid is foamed with a gas selected from the group consisting of nitrogen and carbon dioxide.

21. The method of claim 17 wherein the gelling agent in the second stage fluid is selected from the group consisting of galactomannan gums, modified or derivatized galactomannan gums, cellulose derivatives, xanthan biopolymer, succinoglycan biopolymer, polyacrylamides, polyacrylates, and a terpolymer of 2-acrylamido-2-methylpropane sulfonic acid, acrylamide and acrylic acid.

22. The method of claim 17 wherein the gelling agent in the second stage fluid is selected from the group consisting of hydroxyethylcellulose, hydroxypropyl guar, guar and anionically charged guar gelling agents such as carboxymethyl guar, carboxymethylhydroxypropylguar, carboxyethylguar and carboxymethylhydroxyethylcellulose.

23. The method of claim 17 wherein the gelling agent in the second stage fluid is guar.

24. The method of claim 17 wherein the gelling agent is present in the second stage fluid in an amount in the range of from about 0.1% to about 1.0% by weight of the liquid therein.

25. The method of claim 17 wherein the borate cross-linker is selected from the group consisting of boric acid, borax, ulexite and colemanite.

26. The method of claim 17 wherein the borate cross-linker is boric acid.

27. The method of claim 17 wherein the borate cross-linker is present in the second stage fluid in an amount in the range of from about 0.03% to about 2% by weight of the liquid therein.

28. A method of fracturing a subterranean zone comprising the steps of:

(a) placing a first stage fluid that comprises a foamed liquid containing a water soluble gel breaker into the subterranean zone at a rate and pressure sufficient to create or extend at least one fracture therein, wherein the water soluble gel breaker in the first stage fluid is selected from the group consisting of hemicellulose enzyme, mannase enzyme and glactase enzyme;

(b) placing a second stage fluid that comprises a viscous liquid containing proppant particles and a borate cross-linked gelling agent into the subterranean zone at a rate and pressure sufficient to cause the second stage fluid to enter the fracture, wherein the cross-linked gelling agent comprises guar or a guar derivative; and (c) reducing the pressure in the subterranean zone so that the first stage fluid mixes with the second stage fluid and the water soluble gel breaker in the first stage fluid reacts with and uncross-links the gelling agent in the second stage fluid whereby the viscosity of the fluid mixture is reduced.

29. The method of claim 28 wherein the subterranean zone has a low temperature.

* * * * *